US008532271B2

(12) United States Patent
Lin

(10) Patent No.: US 8,532,271 B2
(45) Date of Patent: Sep. 10, 2013

(54) CYBERCRIME DETECTING AND PREVENTING METHOD AND SYSTEM ESTABLISHED BY TELEPHONE NUMBER CODE, AUTHORIZATION CODES AND SOURCE IDENTIFICATION CODE

(76) Inventor: Chung-Yu Lin, Kaohsiung (TW)

( * ) Notice: Subject to any disclaimer, the term of this patent is extended or adjusted under 35 U.S.C. 154(b) by 890 days.

(21) Appl. No.: 12/689,646

(22) Filed: Jan. 19, 2010

(65) Prior Publication Data
US 2010/0183130 A1  Jul. 22, 2010

Related U.S. Application Data

(60) Provisional application No. 61/202,015, filed on Jan. 21, 2009.

(51) Int. Cl.
*H04M 11/00* (2006.01)
(52) U.S. Cl.
USPC ............... 379/93.02; 726/4; 726/23; 726/27
(58) Field of Classification Search
USPC ............. 379/93.02; 726/4, 23, 27; 707/661; 709/225
See application file for complete search history.

(56) References Cited

U.S. PATENT DOCUMENTS

| 7,447,772 B2 * | 11/2008 | Natsuno et al. ............... 709/225 |
| 2007/0162742 A1 | 7/2007 | Song et al. |
| 2012/0144498 A1 * | 6/2012 | Buhrmann et al. ............. 726/26 |

* cited by examiner

*Primary Examiner* — Gerald Gauthier
*Assistant Examiner* — Simon King
(74) *Attorney, Agent, or Firm* — Bacon & Thomas, PLLC

(57) ABSTRACT

A cybercrime detecting and preventing method and system includes a website, an interface dynamic web page, a search program, and a database. When a network user inputs a "telephone number code" and "authorization code" of a network server using an internet accessing device, the user is also required to input a "source identification code." When access to a network receiver or server is requested, a "telephone number code and authorization code" set is input to the website for comparison with "telephone number codes" and "authorization codes" stored in the database. If the input "telephone number code and authorization code" set does not match the stored "telephone number code and authorization code" set, the "source identification code" is transmitted to a computer to be analyzed and determine the location of the cybercriminal and relay information on the cybercrime to an appropriate public security organization.

20 Claims, 4 Drawing Sheets

CYBERCRIME DETECTING AND PREVENTING METHOD AND SYSTEM ESTABLISHED BY TELEPHONE NUMBER CODE, AUTHORIZATION CODES AND SOURCE IDENTIFICATION CODE

This application claims the benefit of provisional U.S. Patent Application Ser. No. 61/202,015, field Jan. 21, 2009.

FIELD OF THE PRESENT INVENTION

The present invention is related to the technical field of detecting and preventing cybercrime, and in particular to a system and method that not only can actively detect the source of a cyberattack and analyze the location of the cybercriminal, but also can relay the information on the crime and criminal to the related public security organization so as to create a network usage environment with improved safety and thereby promote development of various network application services that require a high degree of security.

BACKGROUND OF THE INVENTION

Currently, sending or receiving Email, browsing web sites, performing financial transactions in connection with shopping over a network, and using VoIP (Voice over Internet Protocol) to communicate with other people by using either the Internet and World Wide Web (www), a fixed-line telephone via a PSTN (Public Switched Telephone Network), or a cellular phone via GSM (Global System for Mobile Communications), TDMA (Time Division Multiple Access), CDMA (Code Division Multiple Access), or PDC (Personal Digital Cellular) systems, has become a popular phenomena in everyday living and work. However, due to daily increases in website visitors and mass circulation of Email, as well as the increasing popularity of Internet-phone usage, cybercrimes such as disabling an Email box with spam, destruction of web sites and telephone/network financial fraud by hackers, have become rampant. In order to curb such cybercrimes, various coping systems and methods have been proposed including those disclosed in Taiwan invention patent nos. I295136, I221380 (namely to the U.S. Pat. No. 7,447,772), I307235 (namely to the US Patent Application Publication Pub. No. US2007/0162742), granted publication no. 494334, laid-open publication no. 200536338 (Publication Date: Nov. 1, 2005), laid-open publication no. 200814703 (Publication Date: Mar. 16, 2006) and so on. While the technology applied by all of the foregoing inventions differs, all of the different preclusive measures corresponding to each variant invention ultimately all share common coping means involving identity authentication and verification to prevent illicit access by cybercriminals to network activities performed by authorized network users.

However, the effect achieved by all of foregoing inventions is only to passively prevent certain specific websites or certain specific financial transactions on the network from being trespassed by cybercrime criminals, with no way to actively detect the identity sources of the cybercrimes and further provide useful cybercrime information to public security organizations so that they can catch or arrest the cybercriminals to be dealt with according to law. As long as the cybercriminals remain at large, cybercrimes will continue to happen and the struggle against them will be endless. There is therefor an urgent need not only to prevent but also to clear up trespasses by cybercriminals and thereby build up a desirable usage environment that provides greater safety so that all the network users can enjoy all network services free from fear and worry.

The present invention addresses this problem by modifying and extending an earlier concept of the inventor of the present invention, which was set forth in Taiwan invention patent application no. 93112373, entitled "method of searching a specific computer IP address using telephone number codes and an identification code" which was filed on Apr. 30, 2004 and was granted and issued as invention patent certificate number of I262407 after having been published. The basic concept of the invention was to employ a specific "telephone number code and identification code" mode, which is combined with a proprietary "telephone number code" of a natural person or legal entity such as a corporation, and a selected "identification code" to serve as a searching means, and in which the proprietary "telephone number code" is unique yet easily memorized and convenient to use, while the "identification code" adds a secretive and mnemonic feature. The "telephone number code" has the valuable attribute that it is acquired and issued by a nationally accredited and licensed telecommunications institution upon application and payment instead of being unconditionally issued in a random manner and free of charge. The "telephone number code" further has the attributes that it is made of a few numerical characters appended to a "country code" and "area code", so that it is easily memorized, and is easily keyed in conventional keypads of a computer, telephone or cellular phone. On the other hand, the "identification code" has the attribute that it is arbitrarily and mnemonically selected by the owner of the proprietary "telephone number code" at his own discretion in a secretive manner. With such attributes, the "telephone number code and identification code" can easily be used to enable search by an authorized user for a certain domain name, Email IP (Internet Protocol) address, or computer IP address of VoIP (Voice over Internet Protocol) while preventing anyone who has not been informed of the "identification code" from access even with knowledge of the "telephone number code.". The inventor established a "www.2uDG.com" web site in accordance with the method and concept of the above-described invention patent (Patent No. I262407) for testing a practical application after he applied the invention patent. So far, the "www.2uDG.com" web site has been running very well with satisfactory results to meet expected efficiency. Accordingly, the inventor has established viability of the concept of "telephone number code and identification code" and has undertaken further research and development to discover further functions and applications, resulting in the "cybercrime detecting and preventing method and system established by telephone number code, authorization code and source identification code" of the present invention.

SUMMARY OF THE INVENTION

The present invention extends the concept of using a "telephone number code" and "authorization code" as a cybercrime identifier by checking if a network user can input the correct "telephone number code" and "authorization code" of a network receiver (or server). To accomplish this, the present invention provides a cybercrime detecting and preventing website which prompts network users to visit the cybercrime detecting and preventing website and input a telephone number and an authorization code selected by the network user at the network user's discretion. In addition, the invention provides the input or detection of a source identification code belonging to an internet user's accessing device (or server), which source identification code can be used to trace the location of an unauthorized requester trying to access the network receiver, if authentication fails and the frequency of authentication failures associated with the source identification code is high, suggesting that a cybercrime is being attempted.

More specifically, the present invention provides a "cybercrime detecting and preventing method established by telephone number code, authorization code and source identification code" comprising the following steps:

(a) initially, all network users are prompted to visit a cybercrime detecting and preventing website and, if a network user wishes to utilize the protective services offered by the website, the network user is prompted to input a "telephone number code" proprietary to the network user and a corresponding "authorization code" selected by the network user at the network user's discretion, together with a "source identification code" serving as an ID code of the internet accessing device, as records into corresponding "telephone number code", "authorization code" and "source identification code" fields of a dynamic interface web page of the cybercrime detecting and preventing website;

(b) the cybercrime detecting and preventing website then automatically registers and stores, in a checking comparison database, all records of "telephone number code" and "authorization code" input to the interface dynamic web page;

(c) when a network requester subsequently wishes to connect to the network receiver or server and inputs a "telephone number code" and "authorization code" of the network receiver by using the internet accessing device or server, the website immediately initiates a detecting search program that runs a checking comparison between the input "telephone number code and authorization code" set and "telephone number code and authorization code" sets that have previously been registered and stored in the checking comparison database to determine whether the input "telephone number code" has previously been registered, and whether the corresponding "authorization code" is correct;

(d) if the input "telephone number code and identification code" set is not identical to a stored "telephone number code and authorization code" set, the detecting search program in the cybercrime detecting and preventing website issues a message or command such as "non-matched in checking comparison" and informs the purported network user via the internet accessing device or server of the matching failure using an instruction sentence such as "please re-input telephone number code and authorization code" and transmits the "source identification code" of the internet accessing device or server to a cybercrime detecting and preventing computer to serve as analytical statistics data needed by the cybercrime detecting and preventing means. On the other hand, in a subordinate step (d'), if the input "telephone number code and authorization code" set matches a previously stored and registered "telephone number code and authorization code" set, then authentication has occurred and the connection to the network receiver may be completed.

By means of statistically analyzed source identification code information, the exact network location of the network user can be easily determined and timely relayed to the relevant public security organization so that the security organization can immediately take proper to detect and eliminate a cybercrime so that not only can network fraud and trespass against network users be avoided, but also a better network usage environment with high security can be created.

In order to implement the foregoing method, the invention also provides a "cybercrime detecting and preventing system established by telephone number code, authorization code and source identification code" that includes a cybercrime detecting and preventing website, an interface dynamic web page, a detecting search program and a checking comparison database, wherein the cybercrime detecting and preventing website includes a web server connected to the World Wide Web or Internet and capable of receiving input data and outputting data conforming to various protocols of the World Wide Web or Internet. The interface dynamic web page is programmed using a software language compatible with one of the applicable languages for the World Wide Web or Internet, and is hierarchically accessible via the web homepage or homepage of the cybercrime detecting and preventing website with blank fields for "telephone number code", "authorization code" and "source identification code" for inputting relevant information. The detecting search program, which is also programmed using a software language compatible to one of the globally applicable languages for the World Wide Web, performs detecting and checking comparison functions initiated by a request command from the interface dynamic web page. Finally, the checking comparison database, which is included in a website server of the cybercrime detecting and preventing website, registers and stores every proprietary "telephone number code" of all network users and every corresponding "authorization code", which is selected by every corresponding owner of the proprietary telephone number code at his own discretion.

By means of mutual connection between various cybercrime detecting and preventing websites in the system of the present invention and the World Wide Web or Internet, an active cybercrime detecting and preventing network can be built to timely provide and relay useful statistically-analyzed cybercrime information to an appropriate public security organization to immediately take proper action to detect and eliminate cybercrime so that not only can network fraud and trespass against network users be avoided, but also a better network usage environment with high security can be created.

DETAILED DESCRIPTION OF THE PREFERRED EMBODIMENTS

Figure 1:
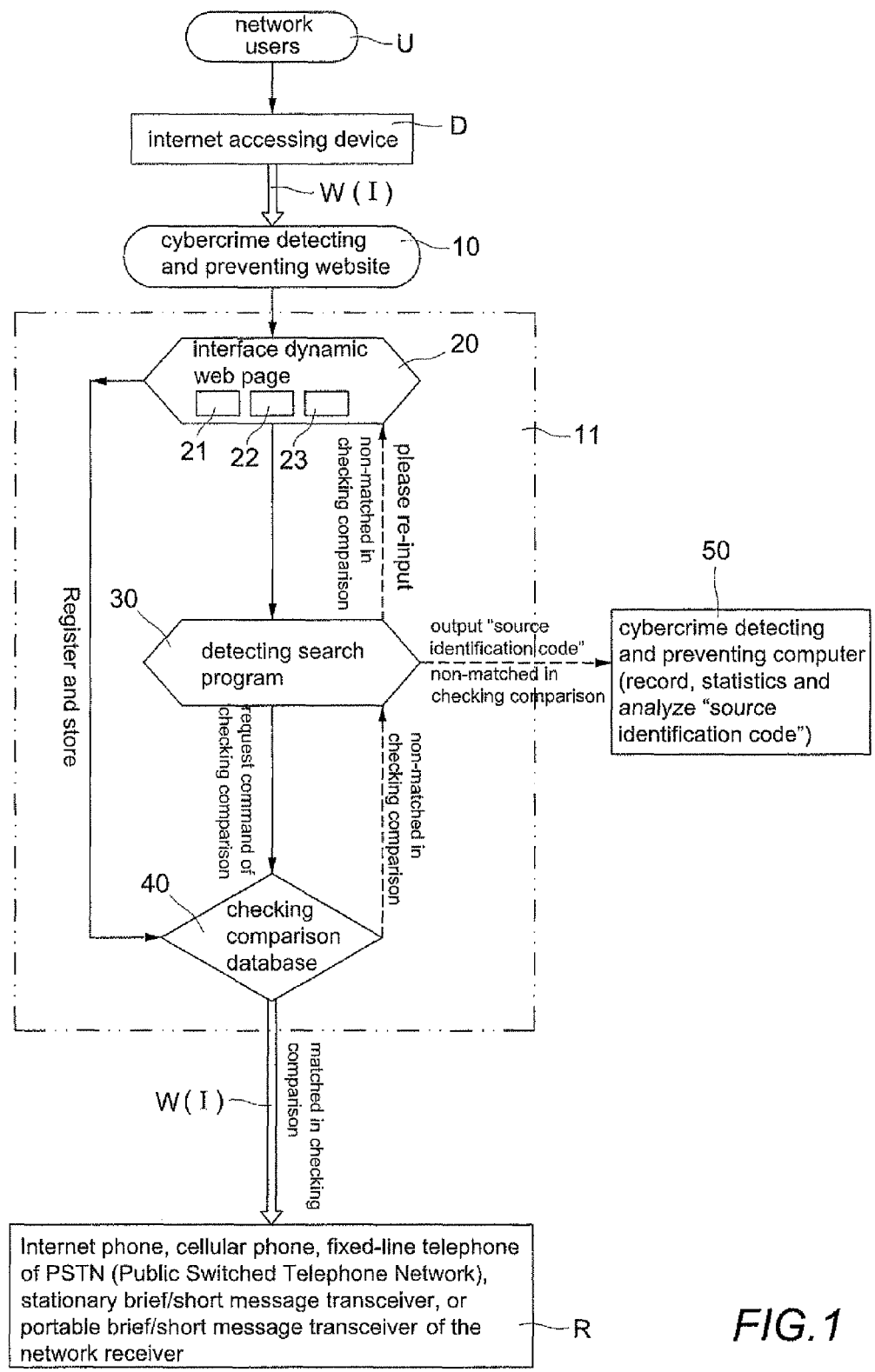
FIG. 1 is a first schematic system block diagram of the present invention.
Figure 2:
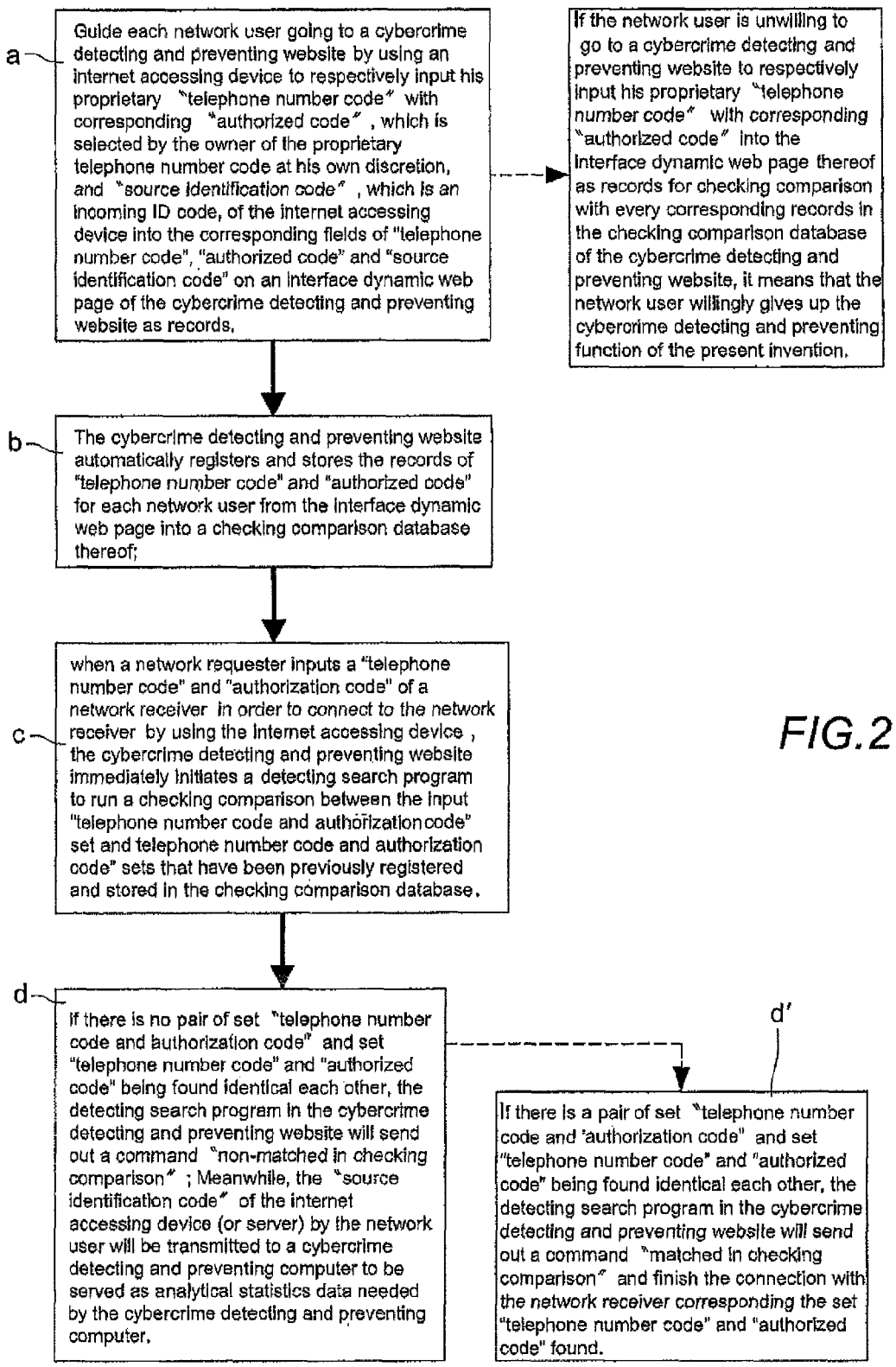
FIG. 2 is a flow chart showing the procedure of the present invention.

As shown in FIGS. 1 and 2, the operation procedure for the "cybercrime detecting and preventing method established by telephone number code, authorization code and source identification code" of the present invention includes the following steps:

(a) Initially, all network users U are prompted to visit the cybercrime detecting and preventing website 10 and any network user who wishes to use the identity-theft prevention services provided by the website is prompted to use his or her internet accessing device D to respectively input a proprietary "telephone number code" of the network user U together with a corresponding "authorization code" selected by the network user U at his or her own discretion, and a "source identification code" that serves as an ID code of the internet accessing device D, into a corresponding "telephone number code" field 21, "authorization code" field 22 and "source identification code" field 23 of an interface dynamic web page 20 of the cybercrime detecting and preventing website 10;

(b) The cybercrime detecting and preventing website 10 then automatically registers and stores, in a checking comparison database 40, the records of "telephone number code" 21 and "authorization code" 22 input by each network user U through the interface dynamic web page 20;

(c) Subsequently, when a network requester inputs a "telephone number code" and "authorization code" of a network receiver R in order to connect to the network receiver R by using the internet accessing device D, the cybercrime detecting and preventing website immediately initiates a detecting search program 30 to run a checking comparison between the input "telephone number code and authorization code" set and "telephone number code and authorization code" sets that have been previously registered and stored in the checking comparison database 40; and (d) if the "telephone number code and authorization code" set input by the network user U does not match a previously registered and stored "telephone number code and authorization code," the network user U is prompted to re-input the "telephone number code and authorization code" set and, a detecting search program 30 in the cybercrime detecting and preventing website 10 transmits the "source identification code" of the internet accessing device D (or server) to a cybercrime detecting and preventing computer 50 for analysis.

On the other hand, in a subordinate step (d'), if a match is found between the input "telephone number code and identification code" set and previously registered and stored "telephone number code and authorization code" sets, the cybercrime detecting and preventing website 10 will send out a command such as "matched in checking comparison" and finish the connection with the network receiver R corresponding to the matched "telephone number code and authorization code" set.

In the above-described step (a), if the network user U is unwilling to go to a cybercrime detecting and preventing website 10 to respectively input his proprietary "telephone number code" and a corresponding "authorization code" into the interface dynamic web page 20 as records for checking comparison with corresponding records in the checking comparison database 40, the network user U is deemed to willingly have given up the cybercrime detecting and preventing function of the present invention.

In the above-described steps (a), (e) and (a), the source identification code 23 can either be a static or dynamic IP address of the internet accessing device D, or an assigned network address serial number of the terminal device belonging to the internet accessing device D. Moreover, the internet accessing device D can be any one of an Internet phone, a cellular phone, a fixed-line telephone connected to a PSTN (Public Switched Telephone Network), a stationary brief/short message transceiver, or a portable brief/short message transceiver.

Still further, in the above-described step (a), the proprietary "telephone number code" of the user can be a telephone number of either a natural person or a legal entity such as a corporation. Moreover, the "telephone number code" 21 can include a serial string mode up of either "country code-area code-local telephone number code" or "country code-cellular phone number code," while the "authorization code" 22 can be any combination of -alphabetic characters, numerals, and/or symbols selectively keyed-in by any conventional computer keyboard. If the "source identification code" 23 of the internet accessing device D is not input into the corresponding "source identification code" 23 field on the interface dynamic web page 20, then the detecting search program 30 will automatically detects the "source identification code" 23 of the internet accessing device D.

Statistical analysis of the "source identification code" 23 in step (d) as described above is performed by comparing the accumulated input frequency amount of the transmitted "source identification code" 23 of the internet accessing device D in a preset time period with a number value prescribed by the cybercrime detecting and preventing website 10.

Therefore, when a cyber criminal attempts to use an internet accessing device D of a network user U to input a proprietary "telephone number code and authorization code" without knowing the proprietary "telephone number code" and corresponding "authorization code" of the network user U, the "source identification code" 23 of the internet accessing device D will be detected by the detecting search program 30 in the cybercrime detecting and preventing website 10 and sent to the cybercrime detecting and preventing website 10 together with the input "telephone number code and authorization code" for checking comparison with every "telephone number code and authorization code" in the checking comparison database 40 and, upon failing to find a set of "telephone number code and authorization code" in the checking comparison database 40 that is identical with the "telephone number code and authorization code" input by the cybercriminal, the detecting search program 30 in the cybercrime detecting and preventing website 10 will send out a command such as "non-matched in checking comparison" and the "source identification code" 23 of the internet accessing device D used by the cybercriminal will be transmitted to the cybercrime detecting and preventing computer 50 to serve as analytical statistics data needed by the cybercrime detecting and preventing means. If the accumulated input frequency amount of the transmitted "source identification code" 23 of the internet accessing device D exceeds a number value prescribed by the cybercrime detecting and preventing website 10 within a predetermined time period, the user of the internet accessing device D is judged as a cybercriminal. The statistically analyzed information can then be directly sent to a public security organization to catch or arrest the cybercriminal for treatment according to law.

Figure 3:
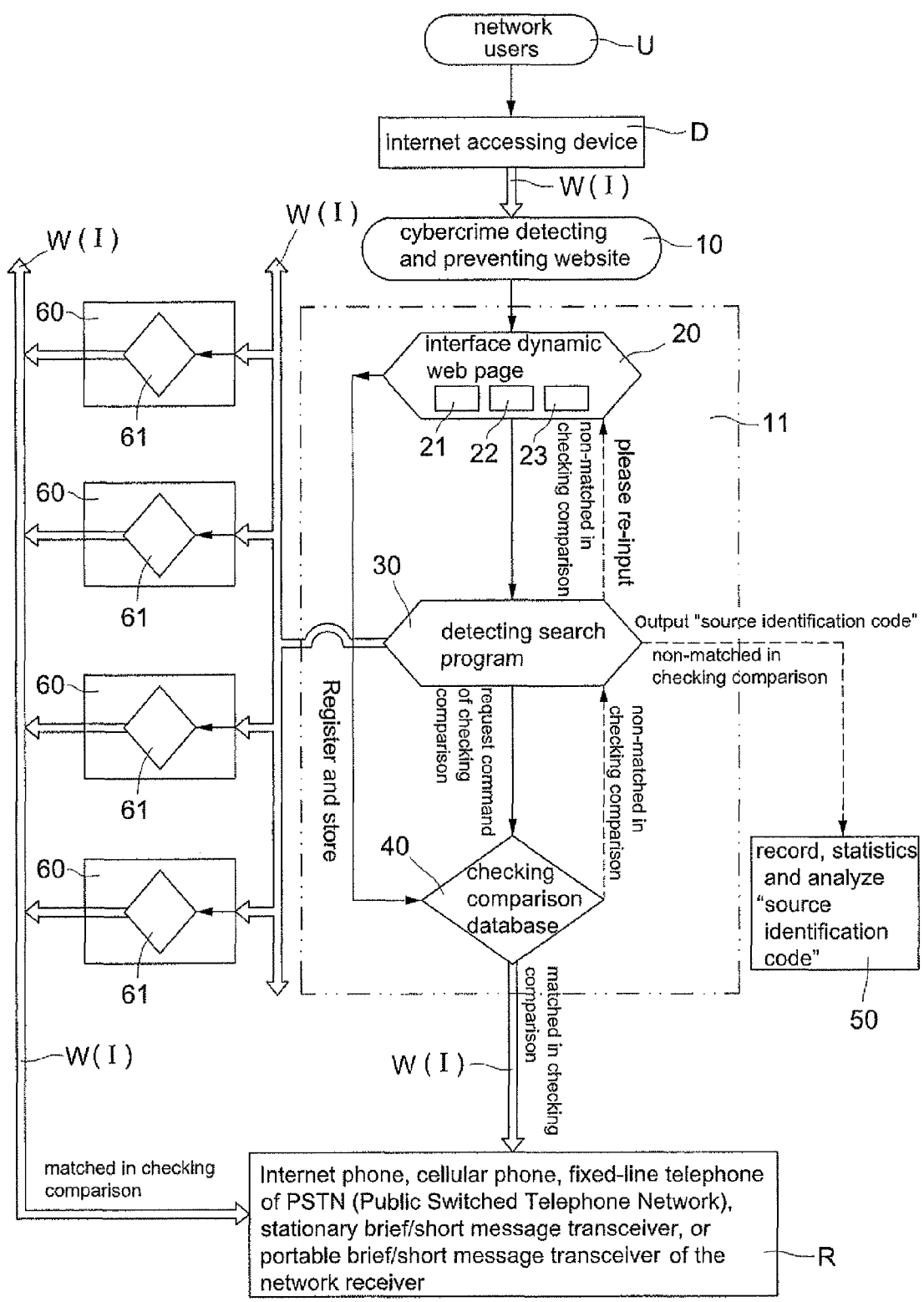
FIG. 3 is a second schematic system block diagram of the present invention.
Figure 4:
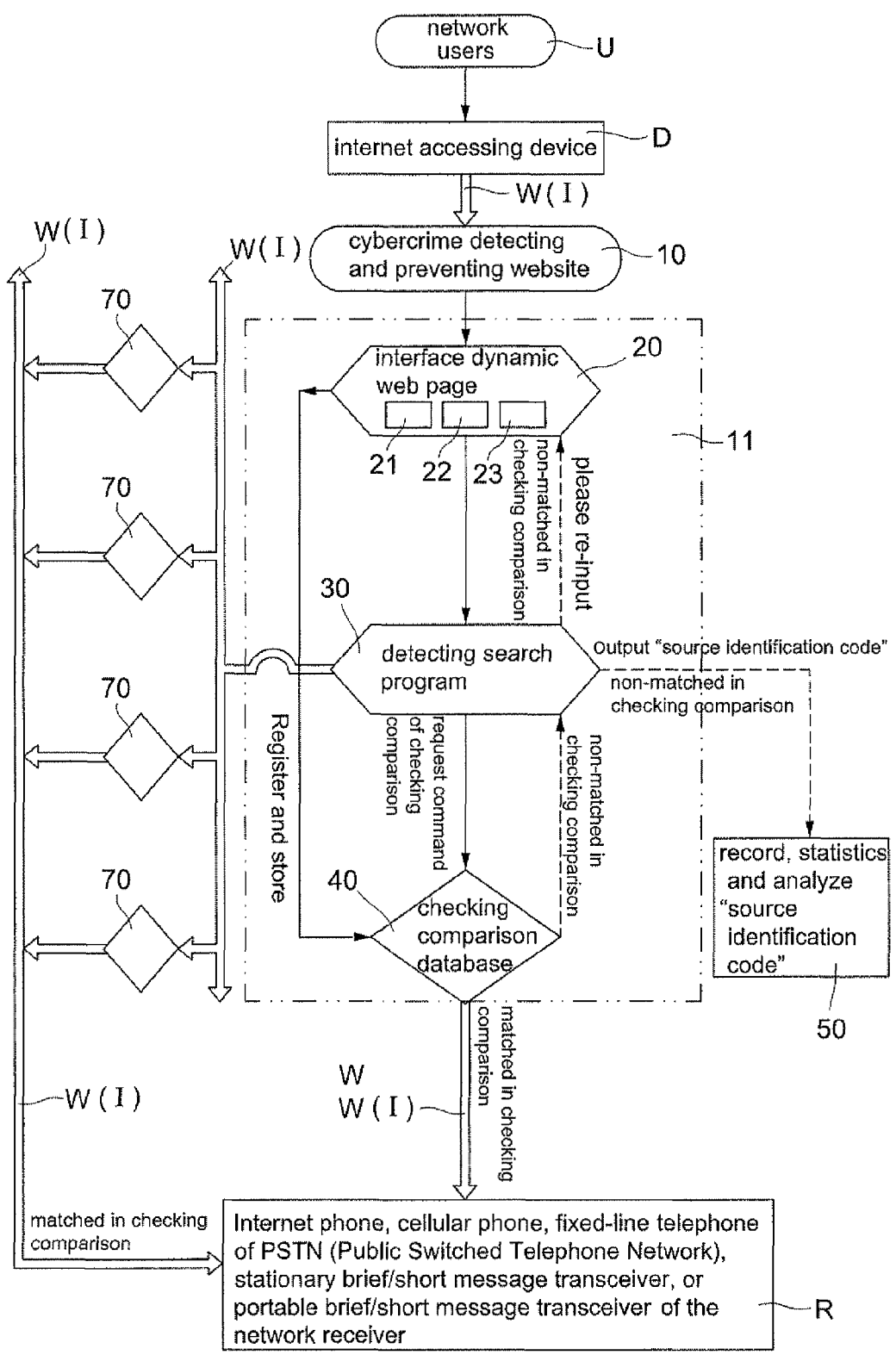
FIG. 4 is a third schematic system block diagram of the present invention.

FIGS. 1, 3 and 4 show a system which is constructed to implement the "cybercrime detecting and preventing method established by telephone number code, authorization code and source identification code" of the present invention, and which includes a cybercrime detecting and preventing website 10, an interface dynamic web page 20, a detecting search program 30 and a checking comparison database 40.

Cybercrime detecting and preventing website 10 includes a website server 11 connected to the World Wide Web W or Internet I and arranged to receive input data and to transmit output data conforming to various protocols of the World Wide Web W or Internet I.

Interface dynamic web page 20, which is programmed using a software language compatible with one of the applicable languages for the World Wide Web W or Internet I, is a web page hierarchically arranged under the web homepage or homepage of the cybercrime detecting and preventing website 10 with blank fields for input of the "telephone number code" 21, "authorization code" 22 and "source identification code" 23.

Detecting search program 30, which is also programmed using a software language compatible with one of the globally applicable languages for the World Wide Web W, performs detecting and checking comparison functions initiated by a request command from interface dynamic web page 20.

Finally, checking comparison database 40, which is in a website server 11 of the cybercrime detecting and preventing website 10, registers and stores every proprietary "telephone number code" of all network users U and every corresponding "authorization code" selected by a corresponding owner of the proprietary telephone number code at his own discretion.

The checking comparison database 40 may further include all of the checking comparison databases 61 in each server of every cybercrime detecting and preventing website 60 connected to the World Wide Web W or Internet I (as shown in FIG. 3) such that each checking comparison database 61 also registers and stores every proprietary telephone number code of all network users U and every corresponding authorization code selected by every corresponding owner of the proprietary telephone number code at his own discretion.

In addition, the checking comparison database 40 may further include any checking comparison database 70 connected to the Internet I that also registers and stores every proprietary telephone number code of all network users U and every corresponding authorization code selected by every corresponding owner of the proprietary telephone number code at his own discretion (as shown in FIG. 4).

What is claimed is:

1. A cybercrime detecting and preventing method established by telephone number code, authorization code and source identification code, comprising the steps of:
   (a) prompting a network user to go to a cybercrime detecting and preventing website to input, into corresponding fields of webpage of the cybercrime detecting and preventing website, a "telephone number code" and a corresponding "authorization code" of a internet accessing device or server, and a "source identification code," the "authorization code" selected by an owner of the telephone number code and the "source identification code" serving as an ID code of the internet accessing device or server;
   (b) the cybercrime detecting and preventing website automatically registering and storing records of the "telephone number code" and "authorization code" input by the network user through an interface dynamic web page into a checking comparison database;
   (c) when connection to the network receiver is subsequently requested, prompting the requester to input a "telephone number code and authorization code" set of a network receiver, and initiating a detecting search program to run a comparison between the input "telephone number code and authorization code" set and "telephone number code and authorization code" sets that have previously been stored in the checking comparison database in order to determine whether the input "authorization code" corresponds to the "authorization code" of a registered and stored "telephone number code and authorization code set" corresponding to the input "telephone number code";
   (d) if the "authorization code" of the input "telephone number code and authorization code" set does not match an "authorization code" corresponding to a "telephone number code" of a registered and stored "telephone number code and authorization code" set, transmitting the corresponding "source identification code" of the requester's internet accessing device or server to a cybercrime detecting and preventing computer to serve as analytical statistics data for use in determining whether and where a cybercrime is being committed.

2. The cybercrime detecting and preventing method as claimed in claim 1, wherein said source identification code in steps (a), (c) and (d) is a static IP address of the internet accessing device or server.

3. The cybercrime detecting and preventing method as claimed in claim 1, wherein said source identification code in steps (a), (c) and (d) is a dynamic IP address of the internet accessing device or server.

4. The cybercrime detecting and preventing method as claimed in claim 1, wherein said source identification code in steps (a), (c) and (d) is an assigned network address serial number of a terminal device belonging to the internet accessing device or server.

5. The cybercrime detecting and preventing method as claimed in claim 1, wherein said internet accessing device in steps (a), (c) and (d) is an Internet phone.

6. The cybercrime detecting and preventing method as claimed in claim 1, wherein said internet accessing device in steps (a), (c) and (d) is a cellular phone.

7. The cybercrime detecting and preventing method as claimed in claim 1, wherein said internet accessing device in steps (a), (c) and (d) is a fixed-line telephone of a PSTN (Public Switched Telephone Network).

8. The cybercrime detecting and preventing method as claimed in claim 1, wherein said internet accessing device in steps (a), (c) and (d) is a stationary short message transceiver or a portable short message transceiver.

9. The cybercrime detecting and preventing method as claimed in claim 1, wherein said proprietary telephone number code in step (a) is a telephone number of either a natural person or a legal entity.

10. The cybercrime detecting and preventing method as claimed in claim 1, wherein said "telephone number code" in step (a) a serial string made up of country code-area code-local telephone number code.

11. The cybercrime detecting and preventing method as claimed in claim 1, wherein said "telephone number code" in step (a) is a serial string made up of country code-cellular phone number code.

12. The cybercrime detecting and preventing method as claimed in claim 1, wherein said "authorization code" in step (a) is any combination of alphabetic characters, numerals, or symbols selectively keyed-in by a computer keyboard.

13. The cybercrime detecting and preventing method as claimed in claim 1, wherein the detecting search program automatic detects said "source identification code" of the internet accessing device or server.

14. The cybercrime detecting and preventing method as claimed in claim 1, wherein a statistical analysis is performed in step (d) by comparing an accumulated input frequency amount of the transmitted "source identification code" of the internet accessing device or server with a number value prescribed by the cybercrime detecting and preventing website.

15. The cybercrime detecting and preventing method as claimed in claim 1, wherein said step (d) further includes a subordinate step (d') of, if an input "telephone number code and authorization code" set matches a previously registered and stored "telephone number code and authorization code," completing connection to the network receiver.

16. The cybercrime detecting and preventing method as claimed in claim 1, wherein in step (d) when no match is found, the user is prompted at least once to re-input the "telephone number code and authorization code" set.

17. A cybercrime detecting and preventing system, comprising: a cybercrime detecting and preventing website; an interface dynamic web page; a detecting search program; and a checking comparison database, wherein:

said cybercrime detecting and preventing website includes a website server connected to the World Wide Web or Internet;

said interface dynamic web page includes blank fields for input of a "telephone number code", "authorization code" and "source identification code";

said detecting search program performs detecting and checking comparison functions initiated by a request command from the interface dynamic web page; and said checking comparison database registers and stores proprietary "telephone number codes" of network users and together with corresponding "authorization codes" selected by corresponding owners of respective telephone number codes, wherein said detecting and checking comparison functions performed by the detecting search program include functions of:

(a) prompting a network user to go to a cybercrime detecting and preventing website to input, into corresponding fields of webpage of the cybercrime detecting and preventing website, a "telephone number code" and a corresponding "authorization code" of a internet accessing device or server, and a "source identification code," the "authorization code" selected by an owner of the telephone number code and the "source identification code" serving as an ID code of the internet accessing device or server;

(b) the cybercrime detecting and preventing website automatically registering and storing records of the "telephone number code" and "authorization code" input by the network user through an interface dynamic web page into a checking comparison database;

(c) when connection to a network receiver is subsequently requested, prompting the requester to input a "telephone number code and authorization code" set of the network receiver, and initiating a detecting search program to run a comparison between the input "telephone number code and authorization code" set and "telephone number code and authorization code" sets that have previously been stored in the checking comparison database in order to determine whether the input "authorization code" corresponds to the "authorization code" of a registered and stored "telephone number code and authorization code set" corresponding to the input "telephone number code";

(d) if the "authorization code" of the input "telephone number code and authorization code" set does not match an "authorization code" corresponding to a "telephone number code" of a registered and stored "telephone number code and authorization code" set, transmitting the input "telephone number code and authorization code" set and corresponding "source identification code" of the requester's internet accessing device or server to a cybercrime detecting and preventing computer to serve as analytical statistics data for use in determining whether and where a cybercrime is being committed.

18. The cybercrime preventing and detecting system as claimed in claim 17, wherein said checking comparison database further includes checking comparison databases in servers of other cybercrime detecting and preventing websites that are connected to the World Wide Web or Internet such that each said checking comparison database also registers and stores proprietary telephone number codes and corresponding authorization codes.

19. The cybercrime preventing and detecting system as claimed in claim 17, wherein said detecting search program is arranged to search the checking comparison database in a server of any cybercrime detecting and preventing website that is connected to the Internet.

20. The cybercrime preventing and detecting system as claimed in claim 17, wherein said detecting search program is arranged to search any checking comparison database that is connected to the Internet and that registers and stores said proprietary telephone number codes and corresponding authorization codes.

* * * * *